US010386634B2

United States Patent
Ekambaram et al.

(10) Patent No.: US 10,386,634 B2
(45) Date of Patent: *Aug. 20, 2019

(54) COLLABORATIVE SCENE SHARING FOR OVERCOMING VISUAL OBSTRUCTIONS

(71) Applicant: INTERNATIONAL BUSINESS MACHINES CORPORATION, Armonk, NY (US)

(72) Inventors: Vijay Ekambaram, Tamilnadu (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,754

(22) Filed: Jan. 25, 2019

(65) Prior Publication Data
US 2019/0155026 A1 May 23, 2019

Related U.S. Application Data

(63) Continuation of application No. 15/912,879, filed on Mar. 6, 2018, now Pat. No. 10,215,985, which is a
(Continued)

(51) Int. Cl.
*G02B 27/01* (2006.01)

(52) U.S. Cl.
CPC ....... *G02B 27/0101* (2013.01); *G02B 27/017* (2013.01); *G02B 2027/014* (2013.01);
(Continued)

(58) Field of Classification Search
CPC .............. G02B 27/0101; G02B 27/017; G02B 2027/0178; G02B 2027/0138; G02B 2027/0123; G02B 2027/014
See application file for complete search history.

(56) References Cited

U.S. PATENT DOCUMENTS 8,854,282 B1 * 10/2014 Wong .................. G06F 3/14
345/7
9,952,429 B2  4/2018 Ekambaram et al.
(Continued)

OTHER PUBLICATIONS

Caramba App Development, "EasyMeasure—Measure with your Camera!" [retrieved on Jun. 22, 2015]. Retrieved from the Internet URL: <apple.com, https://itunes.apple.com/in/app/easymeasure-measure-your-camera!/id349530105? mt=8>, 2014, 2 pgs.
(Continued)

*Primary Examiner* — Jennifer Mehmood
*Assistant Examiner* — James S Nokham
(74) *Attorney, Agent, or Firm* — Michael O'Keefe; Matthew M. Hulihan; Heslin Rothenberg Farley & Mesiti PC

(57) ABSTRACT

Collaborative scene sharing for overcoming visual obstructions is provided. Video feeds of a scene are obtained from multiple devices viewing the scene from different angle. An obstruction obstructs portion(s) of the scene from view by a device. An aggregation grid that partitions views of the scene into cells is established and used in providing an aggregated view of the scene to the device. This includes identifying cell(s) of the aggregation grid for which the view by the device is obstructed by the obstruction, and providing to the device video portion(s) obtained from video feed(s) from the multiple devices. The video portion(s) correspond to the cell(s) for which the view by the device is obstructed, and the video feeds from which the video portions are obtained are from other device(s), of the multiple devices, for which the view for the cell(s) is unobstructed.

20 Claims, 9 Drawing Sheets

Related U.S. Application Data continuation of application No. 14/990,152, filed on Jan. 7, 2016, now Pat. No. 9,952,429.

(52) U.S. Cl.
CPC ........... *G02B 2027/0123* (2013.01); *G02B 2027/0138* (2013.01); *G02B 2027/0178* (2013.01)

(56) References Cited

U.S. PATENT DOCUMENTS

| | | |
|---|---|---|
| 2008/0278821 A1 | 11/2008 | Rieger |
| 2012/0105473 A1 | 5/2012 | Bar-Zeev et al. |
| 2012/0206452 A1 | 8/2012 | Geisner et al. |
| 2012/0242695 A1* | 9/2012 | Martin ............. G09C 5/00 345/633 |
| 2012/0249591 A1 | 10/2012 | Maciocci et al. |
| 2012/0274750 A1* | 11/2012 | Strong ............. G01C 21/165 348/52 |
| 2017/0199377 A1 | 7/2017 | Ekambaram et al. |
| 2018/0196260 A1 | 7/2018 | Ekambaram et al. |

OTHER PUBLICATIONS

"Eye Tracking", wikipedia.com, [retrieved on Jun. 22, 2015]. Retrieved from the Internet URL: <http://en.wikipedia.org/wiki/Eye_tracking>, 15 pgs.

"An introduction to eye tracking and Tobii Eye Trackers", tobii.com, [retrieved on Jun. 22, 2015]. Retrieved from the Internet URL: <http://www.tobii.com/eye-tracking-research/global/library/white-papers/tobii-eye-tracking-white-paper/https://play>, 2015, 21 pgs.

"Smart Measure", google.com, [retrieved on Jun. 22, 2015]. Retrieved from the Internet URL: <google.com/store/apps/details?id=kr.sira.measure&hl=en>, May 15, 2015, 4 pgs.

"Peripheral Vision", wikipedia.com, [retrieved on Jan. 7, 2016]. Retrieved from the Internet URL: <http://en.wikipedia.org/wiki/Peripheral_vision>, 6 pgs.

List of IBM Patents or Applications Treated as Related, Feb. 4, 2019, 2 pgs.

* cited by examiner

208

- 208a
- 208b
- 208c
- 208d
- 208e
- 208f

A is for Apple. B is for Boy.
C is for Cat. D is for Dog.
E is for Elephant. F is for Food.
G is for Girl. H is for Hair.
I is for Ice. J is for Jungle.
K is for Kite. L is for Lake.
M is for Monkey. N is for Night.
O is for Orange. P is for Purple.
Q is for Quilt. R is for Rabbit.
S is for Star. T is for Toy.
U is for Umbrella. V is for Violet.
W is for Watermelon. X is for X-ray.
Y is for Yo-yo. Z is for Zebra.

COLLABORATIVE SCENE SHARING FOR OVERCOMING VISUAL OBSTRUCTIONS

BACKGROUND

When viewing a scene from a distance, expected or unexpected obstructions may present themselves between the viewer and portions of the scene. A common example is a teacher present in front of a blackboard in a classroom or lecture hall obstructing some students from viewing the entire blackboard and its contents. An obvious consequence is that some viewers are at least temporarily unable to see beyond the obstruction and may miss important occurrences or content presented in the scene, such as information on the blackboard or visual elements of a slideshow.

SUMMARY

Shortcomings of the prior art are overcome and additional advantages are provided through the provision of a computer-implemented method that includes obtaining an aggregation grid by a wearable device of multiple wearable devices capturing respective video feeds of a scene of an environment from different angles. The aggregation grid provides a consistent partitioning of views of the scene by the multiple wearable devices into cells. The method also includes, based on an obstruction at least partially obstructing a portion of the scene from view by the wearable device, building an aggregated view of the scene for the wearable device. The building includes identifying one or more cells of the aggregation grid for which the view of the scene by the wearable device is obstructed by the obstruction. The building also includes obtaining, by the wearable device, from at least one other wearable device of the multiple wearable devices, one or more video portions of at least one video feed of the respective video feeds. The one or more video portions correspond to the one or more cells for which the view by the wearable device is obstructed, and the at least one video feed is from the at least one other wearable device, for which the view for the one or more cells is unobstructed. The building further includes displaying the obtained one or more video portions on a display of the wearable device, in which the one or more video portions are provided on the display for the one or more cells for which the view by the wearable device is being obstructed.

Further, a wearable device is provided that includes a memory and a processor in communication with the memory. The wearable device is configured to perform a method, the method including obtaining an aggregation grid. The wearable device is one wearable device of multiple wearable devices capturing respective video feeds of a scene of an environment from different angles. The aggregation grid provides a consistent partitioning of views of the scene by the multiple wearable devices into cells. The method also includes, based on an obstruction at least partially obstructing a portion of the scene from view by the wearable device, building an aggregated view of the scene for the wearable device. The building includes identifying one or more cells of the aggregation grid for which the view of the scene by the wearable device is obstructed by the obstruction. The building also includes obtaining from at least one other wearable device of the plurality of wearable devices, one or more video portions of at least one video feed of the respective video feeds, the one or more video portions corresponding to the one or more cells for which the view by the wearable device is obstructed, and the at least one video feed being from the at least one other wearable device, for which the view for the one or more cells is unobstructed. The building further includes displaying the obtained one or more video portions on a display of the wearable device, in which the one or more video portions are provided on the display for the one or more cells for which the view by the wearable device is being obstructed.

Yet further, a computer program product is provided. The computer program product includes a computer readable storage medium readable by a processing circuit and storing instructions for execution by the processing circuit is provided for performing a method. The method includes obtaining an aggregation grid by a wearable device of multiple wearable devices capturing respective video feeds of a scene of an environment from different angles. The aggregation grid provides a consistent partitioning of views of the scene by the plurality of wearable devices into cells. The method further includes, based on an obstruction at least partially obstructing a portion of the scene from view by the wearable device, building an aggregated view of the scene for the wearable device. The building includes identifying one or more cells of the aggregation grid for which the view of the scene by the wearable device is obstructed by the obstruction. The building also includes obtaining, by the wearable device, from at least one other wearable device of the multiple wearable devices, one or more video portions of at least one video feed of the respective video feeds. The one or more video portions correspond to the one or more cells for which the view by the wearable device is obstructed, and the at least one video feed is from the at least one other wearable device, for which the view for the one or more cells is unobstructed. The building further includes displaying the obtained one or more video portions on a display of the wearable device, in which the one or more video portions are provided on the display for the one or more cells for which the view by the wearable device is being obstructed.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2A-2C depicts an aggregation grid partitioning a scene and identifying obstructed and unobstructed grid cells from different vantage points of the scene, in accordance with aspects described herein;

DETAILED DESCRIPTION

Figure 1:
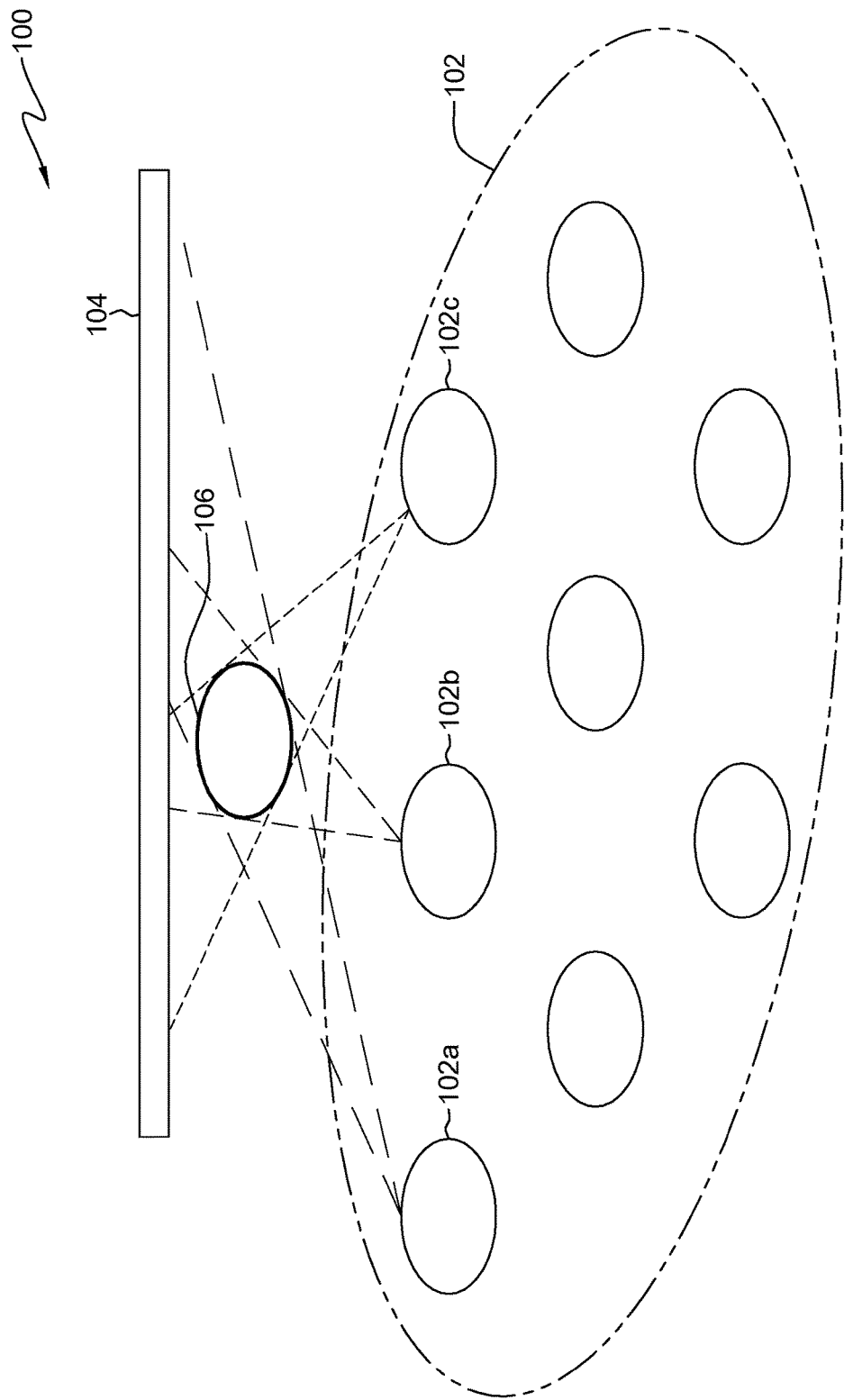
FIG. 1 illustrates an environment in which individuals with different vantage points have different viewable portions of a scene as a result of an obstruction.

When expected or unexpected obstructions obstruct a viewer's partial or entire view of a scene, the viewer misses potentially valuable information. Consider a scenario in which students in a classroom take notes from a blackboard/digital board/chalkboard during a lesson where an obstruction (such as a teacher) stands near the board at least partially blocking the full view of the board. The portions of the scene (e.g. the blackboard) being obstructed by the teacher will vary among the different students depending on their vantage point, or angle of view to the board. FIG. 1 illustrates this in an environment in which individuals with different vantage points have different viewable portions of a scene as a result of an obstruction. In the overhead view of FIG. 1 showing environment 100, an obstruction 106 is positioned between a board 104 and a group of individuals 102 positioned in different locations of the environment. The pairs of dashed lines in FIG. 1 originating from the individuals 102a, 102b, 102c illustrate respective views of individuals 102a, 102b and 102c corresponding to portions of the scene being blocked from view by obstruction 106. Individual 102a, for example, is able to view the left side of board 104 but is blocked from viewing a significant portion of the right side of board 104. Individual 102c can view the right side of board 104 but very little of the left side, and individual 102b can view both sides but cannot view a center portion of board 104. Obstruction 106 could be any obstruction, such as another individual (like a teacher in front of the room), a piece of equipment such as a projector, or a structural feature of the environment such as a pillar or column, as examples.

Aspects described herein provide collaborative scene sharing in which images/video of a scene from multiple vantage points, some of which may include partial obstructions from view of the full scene, are stitched together to provide an aggregated view of the scene to the viewers. Using the above scenario, aspects described herein provide a solution where the students would be able to see a complete and personalized (to their vantage point) view of the scene of the board. Because, as noted above, the areas being obstructed from view will vary across the different viewers, a personalized display can be provided to each viewer based on what portions the viewer is lacking in terms of what the viewer can see from the viewer's position.

Some embodiments provide a wearable device-based solution. In an example, viewers are each presented a complete scene visible in a display of their respective wearable device. The area(s) of the scene that are obstructed from view in the viewer's natural line of sight are provided in the display to overlay what the user would see looking though the display. In this regard, wearable devices can have lens-displays that are transparent like the clear lenses of common glasses but that incorporate display technology. This can allow for images and other content to be presented on the inside surface of the lens—the side facing the user's eye—and integrate with the natural line of sight of the user. Images of the portions of the scene behind the obstruction as viewed by the viewer are acquired from other devices in the environment and presented on the wearable device display to overlay the obstructed portions of the viewer's view. The aggregated view provides to the viewer the look and feel of a full view to the scene, with the viewer continuing to look straight ahead through the lenses of the wearable device. Additionally or alternatively, the wearable device may have a display positioned in the peripheral view of the user, in which case an aggregated view of the scene can be presented on that display. For wearable devices with both forms of display, power consumption may factor into the selection of how to present the aggregated scene to the user. Because non-visible area(s) of a scene vary from one viewer to another, aspects described herein advantageously provide a personalized view of the scene for each viewer by, in part, determining which portions are being obstructed from a viewer's view and filling-in those portions with content acquired from other viewer(s) who have a view of the portions.

Wearable devices, and in particular head-mounted wearable devices, are inherently designed with ergonomic and other considerations taken into account. This enables content to be displayed to a user in a useful manner in which the content is integrated into the user's natural view of the surrounding environment. Further details of an example wearable device to incorporate and/or use aspects described herein are described infra with reference to FIG. 6.

Figure 6:
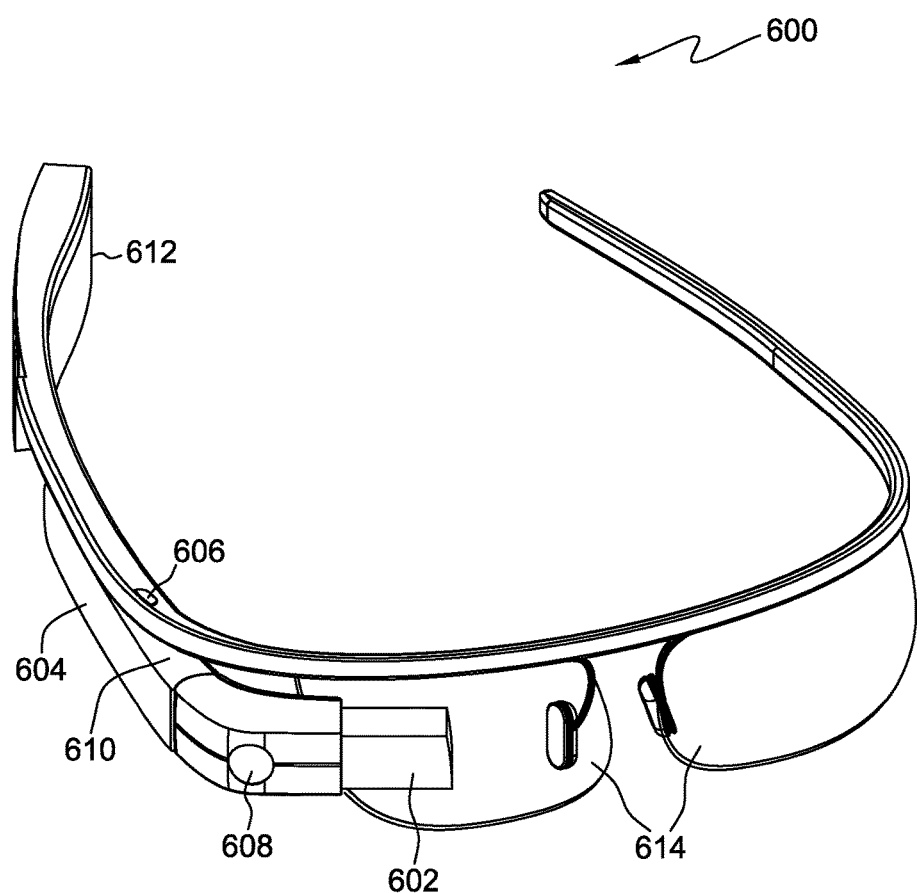
FIG. 6 depicts an example of a wearable device to incorporate or use aspects described herein.

With respect to a wearable device embodiment in which a collection of devices acquire images/video of a scene from different angles, software running on a respective wearable device of each viewer/student (or other device with imaging capability) may continuously or periodically leverage a camera or other imaging system of the device to acquire images of the scene. In a specific example, the viewers wear a wearable device, such as the example wearable device as shown in FIG. 6, that has a camera that images the scene. The viewers' wearable (in this example) devices capture dynamic views of a board on which a teacher writes. The views of the board are internally represented as a grid of cells in the wearable devices and an aggregation server, if present. The aggregation grid partitions the scene into portions in order to facilitate later aggregation of these grid portions. This aggregation grid is determined based on dimensions of the board, proximity to the scene features, and/or any other desired consideration. A grid formation algorithm can be consistent across the wearable devices so that images of a cell of the scene from one student's device can be conveniently substituted into the corresponding cell for another student's device.

Figure 2A:
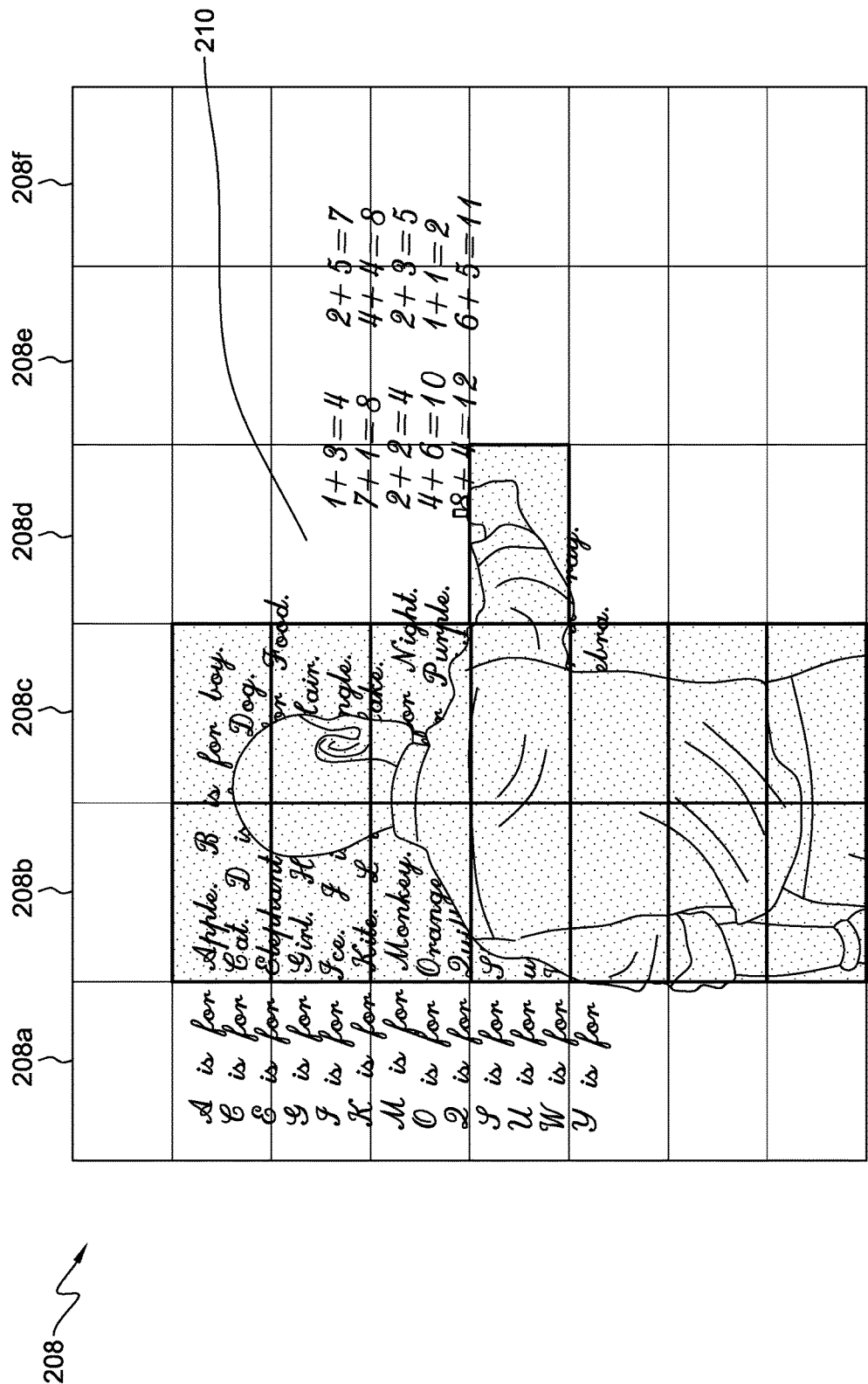
Figure 2B:
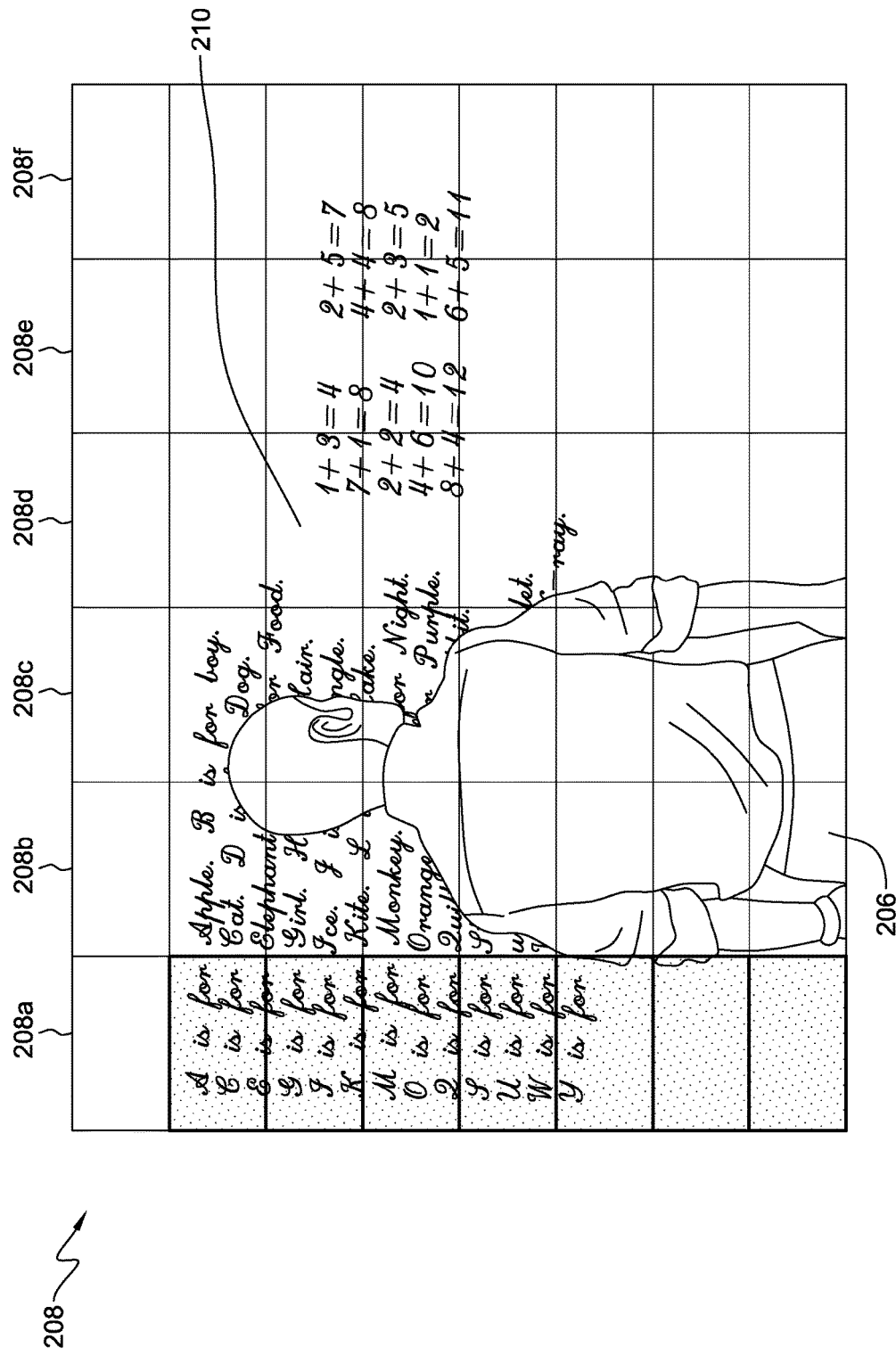

Example view representation of students viewing the board from the first row are shown in FIG. 2A-2C. More specifically, FIGS. 2A-2C depict an aggregation grid partitioning a scene and identifying obstructed and unobstructed grid cells from different vantage points of the scene, in accordance with aspects described herein.

FIG. 2A shows a vantage point of a first student viewing the board roughly from the center behind teacher 206. Aggregation grid 208 overlays the scene of the board, and teacher 206 is shown obstructing the first student's view to various cells. In this example, all cells of columns 208b and 208c (except the two cells in the first row of the grid) and a single cell in column 208d is being obstructed by teacher 206. The obstructed grid cells for the first student are shown in stipple pattern in FIG. 2A, while the un-stippled cells reflect portions for which the first student's view is unobstructed. As a result of the obstruction, the first student has a view to only some of content 210 of the board.

FIG. 2B reflects the obstructed/unobstructed cells for a second student with a vantage point from a right-side (looking at the board) of the space. Again the obstructed grid cells are shown in stipple pattern. Due to the angle from which the second student views the board, the teacher obstructs all cells of column 208a except the cell in the first row of the grid. Thus, in this example, the second student happens to have a view to every cell that the first student cannot see, and vice versa.

In some examples, images from a vantage point of the obstruction itself may be obtained and used in the aggregation. As a specific example, the teacher in the examples of FIGS. 2A-2C can also wear a wearable device with a camera. FIG. 2C reflects an example set of cells viewable by a camera of the teacher's wearable device. Because of the proximity of the teacher to the board and the position of the teacher in this example, the majority of cells are not viewable (the stipple pattern grid cells in FIG. 2C are those for which the teacher does not have a direct view without moving or facing another direction). However, a relatively high-quality, albeit very close, view of the content 210 from cells in columns 208b and 208c is provided from the teacher's current vantage point.

It is seen that every grid cell of the scene of FIGS. 2A-2C is visible to at least one person in the class (based on the position from where student/teacher is viewing the board). The wearable devices of all participating users collect and provide images/videos of the grid cells that are visible to them. These image/video portions can be dynamically shared across the wearable devices to reduce or eliminate the number of obstructed areas of the aggregation grid.

During runtime, and as the scene dynamically changes (for instance the obstruction moves around), each wearable device collects image/video portions and provides one or more to the appropriate entity/entities for aggregation. The appropriate entity may be only itself (if no other wearable device needs an image portion from the wearable device), or may be one or more remote entities, such as server(s) preforming aggregation, or other wearable devices. In this regard, the collection/aggregation from the wearable devices of the image/video portions of unobstructed cells could be performed by one or more centralized servers or in a distributed fashion among the wearable devices. Each wearable device can also maintain an indication of the cells for which its view is blocked. That indication changes dynamically as the obstruction and/or the student moves around. The indication can be provided by the wearable device to a remote aggregation entity, in the case that the distribution of image/video portions is controlled by a central server, or provided to one or more peer wearable devices, in the case that each wearable device is responsible for its own fetching and integration of missing image portions.

The sizing of the grid cells can be adjusted depending on a variety of considerations, including processing capability of the device or devices performing aggregation, and/or the capabilities of the imaging devices, as examples. One approach is to start with a 'medium'-sized grid and dynamically adjust the cell sizing based on the accuracy obtained (e.g. using normal regression). Imperfections in the stitching of image portions from different devices may be less noticeable with a more granular, smaller cell size, though a resulting greater number of cells demands more processing resources and power.

Figure 3:
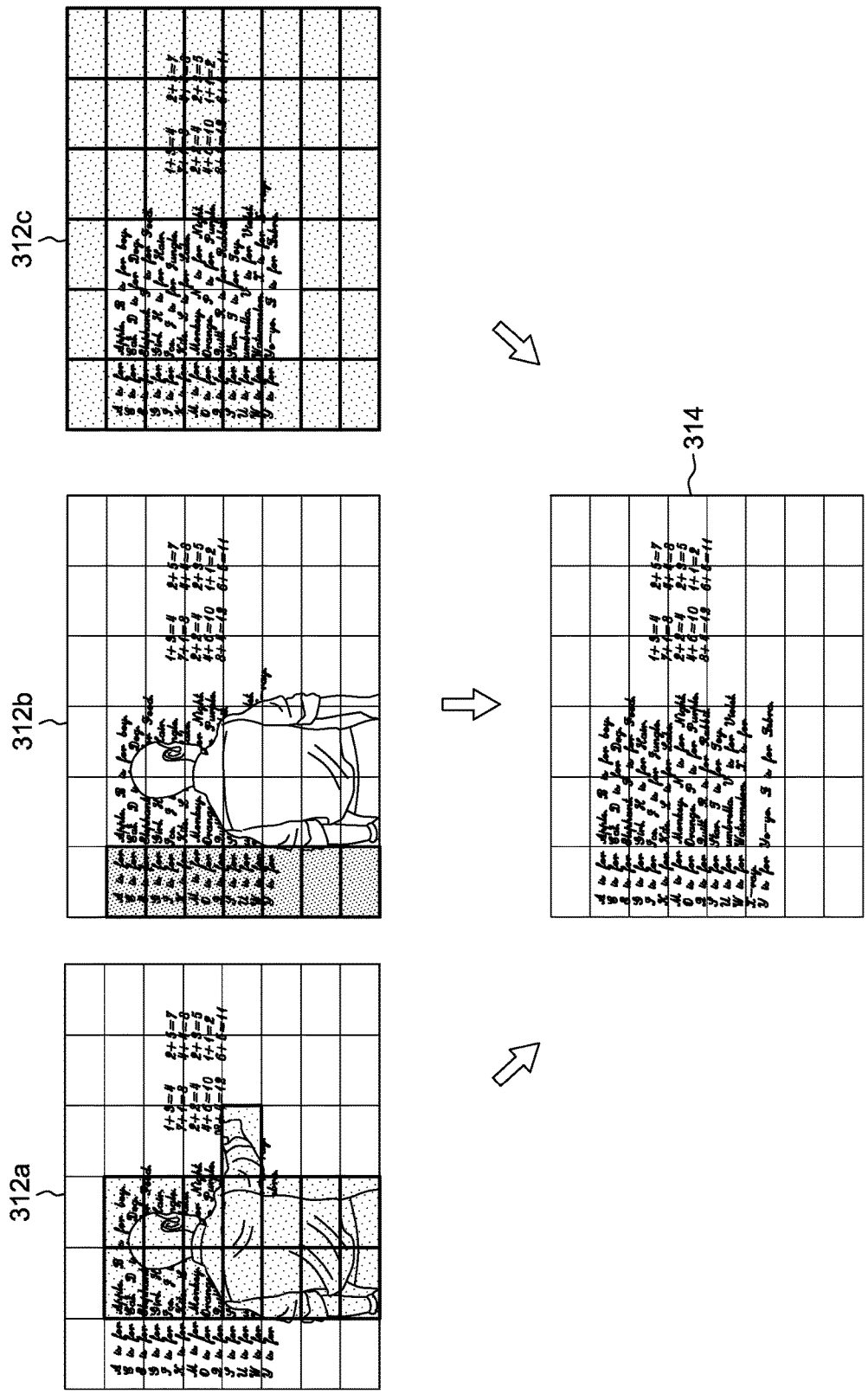
FIG. 3 depicts the building an aggregated view of a scene based on stitching together video portions from live video feeds, in accordance with aspects described herein.

FIG. 3 depicts the building of an aggregated view of a scene based on stitching together video portions from live video feeds, in accordance with aspects described herein. As described previously, there are different possibilities for which device or devices build an aggregated view for a wearable device. The wearable devices capture video from their respective vantage points. In some examples, various wearable devices provide video portions to remote server(s) that then build an aggregated view for a wearable device and provide the aggregated view to the wearable device. Provision of the aggregated view could be provision of a complete video for display, or could be provision of only the video portions needed for the wearable device to complete the scene (fill in the obstructed cells with obtained video portions).

The video portions provided to the remote server(s) by a wearable device can be grid cell portions for which the scene is unobstructed from view by the wearable device. A wearable device can isolate the video portions from the captured video and then provide the isolated portions to the remote server(s), or, to reduce processing on the wearable device, the wearable device provides the captured video with both obstructed and unobstructed portions, and the remote server(s) perform the isolation. Together with a given captured video or video portions, the wearable device or the remote server(s) can determine which cells of the grid are obstructed versus which cells are not obstructed.

Additionally or alternatively, the building of the aggregated views could be handled in a distributed manner, in which a wearable device identifies the video portions that it needs (those for which its view is obstructed) and the video portions for which its view is unobstructed, communicates this to one or more other wearable devices, receives the needed video portions from the other wearable device(s) with unobstructed views to the identified needed portions, and assembles the received portions into its aggregated view.

This building of an aggregated view is depicted in FIG. 3, where the views 312a, 312b and 312c depicted in FIGS. 2A-2C, respectively, are aggregated into an aggregated view 314. A video selection algorithm can be used when there are multiple available, unobstructed video portions corresponding to a same grid cell. The quality, view angle, or other characteristics of the video portions can be used to assess the best one to use for the aggregation. It is also noted that the aggregated view may be built for a common perspective or viewpoint—in the example of FIG. 3, it is head-on to the board. This is useful in situations where a complete aggregated view is being pushed to a user and displayed fully on a display, as opposed to the scenario where only the obstructed portions are being displayed as an overlay to the user's line of sight. Video portions obtained from the various wearable device may be obtained from different angles, so the video portions may be processed to reduce or eliminate skew and normalize them to a common vantage point for the complete view.

Additionally or alternatively, in the scenario where only the obstructed portions are being displayed as an overlay to the user's line of sight, a skew or similar distortion can be applied to an obtained video portion before sending it to a wearable device for aggregating the view, in order to align with the viewpoint of that wearable device and provide a more realistic integration of the video portion with the user's unobstructed cells.

The following sets forth further example implementation details that may be followed in some embodiments:

When a student enters the class and views a scene (such as a blackboard), software in the wearable device queries a centralized server to provide an established grid (i.e. grid configuration—number of rows, number of columns, cell size, etc.) for the scene.

Software in the wearable device internally creates the grid representation for the scene. Software will identify (i) grid cells for which the view to the scene is at least partially obstructed, and (ii) other grid cells for which the view to the scene is unobstructed.

An generalized algorithm as follows is performed:
(i) Software in each wearable device corresponding to a student pushes its respective captured video portions corresponding to its respective unobstructed cells to a centralized server and provides an index of the respective obstructed cells;
(ii) The server collects the video portions from each of the wearable devices and dynamically constructs a complete view of the scene;

(iii) The server also pushes to each wearable device the appropriate video portions corresponding to the obstructed cells for that device (i.e. pushes video portions of unobstructed views for those cells to the wearable device to substitute for the obstructed views). The device then has video portions that it can use to fill in over its obstructed cells.

(iv) Steps (i)-(iii) above are iterated, to thereby maintain an aggregated view of the scene and provide a complete, personalized view to each student corresponding to the wearable devices.

The generalized algorithm above may be relatively expensive approach; various optimizations and intelligent heuristics could be incorporated to reduce the number of push/pulls between the server and the wearable devices.

Alternatively as described herein, the above could be implemented in a distributed fashion without any centralized server.

Further details are provided regarding grid cell direction and quality alignment. Because grid cells are being received from students at various positions, the orientation of the board characteristics of the video portions obtained from the different wearable devices will vary at grid cell granularity. The image/video portions can therefore be normalized to harmonize portions obtained from different captured devices. Alignment of all grid cells can be adjusted with respect to a common reference grid cell, to maintain a common orientation across all grid cells. Skew, zoom, and other transformations can be applied to the images/videos obtained from different devices. Picture quality similarly may be different for different captured devices—one may have greater brightness than another, for instance. A direct replacement of a cell with a video portion from another wearable device may show some deviation in the displayed content in these scenarios. The system can therefore adjust the image/video portions accordingly.

In some embodiments, video portions are adjusted differently according to the recipient of the video portion. A video portion, obtained from a student at the right side of the room, that is to be provided to a student at the left side of the room can be skewed to the angle of the receiving student's viewpoint. This can be done by a central server or by the receiving (or providing) wearable device. More generally, profile-based auto-correction can be applied to received video portions. The profile refers to a profile personalized for a recipient-device. A given wearable device may have substantially better hardware resources than another wearable device. Software in the server(s) or wearable devices themselves can auto-correct content based on the device's profile.

In some embodiments, the wearable devices are responsible for detecting view obstacles/obstructions, and in this regard various approaches are available. As an example, camera(s) can be used to measure distances within a field of view. A gaze point tracker(s) can identify a user's focus-area and the camera can determine a distance to the area. If an object is detected between the eye position of the user and the focus-area, then it can be considered an obstruction and the distance to the obstruction is determined. When an obstacle is detected, software installed in the wearable device or a server checks whether video portions depicting an unobstructed view to that portion of the scene are available. Ideally, there will be one or more wearable devices in relatively close proximity that do have an unobstructed view to that portion of the scene.

A field of view of any user includes the focus areas as well as peripheral areas. In a large environment with multiple participating viewers, such as a sports stadium or concert venue, there will be different focus areas among the different viewers. They will be looking at/viewing potentially different objects and their three-dimensional fields of view will overlap with each other. Aspects described herein identify portions of a viewer's field of view where an obstruction is detected, and then replace or overlay those portions with content captured from others' fields of view. This is irrespective of what each user is focusing on in terms of his/her eyesight; a camera will capture the field of view including the object of focus for that viewer and the peripheral surroundings regardless of where the user's eyesight is focused.

Aspects described herein can also provide zoomed or more detailed content to individual users. Any portion(s) of the scene can be 'zoomed' in the wearable display, if desired, for example the user can zoom in and/or out of any portion of the view, including portions obtained from other devices.

In some embodiments, the zoom is based on the user's eye focus direction. Consider an example where viewers A, B and C are looking at (visually focusing on) a target object X from different distances. A common example would be fans in a baseball stadium viewing a particular player or occurrence on the field. User C is nearest target object X, followed by user B, and then user A. Software of a server or the wearable device(s) can identify which users in the stadium are looking at the target object X based on their eye directions. If user A desires to view object X in more detail or at a closer distance, user A can obtain (based on a request, for instance) portion(s) of the video feed from a closer user, such as user C. Software installed on user A's device (as an example) identifies which other user devices can provide a clearer, closer, etc. view to the target object. The software can monitor for dynamic changes in both the target being viewed as well as the users who can offer a view to the target, and changes can be made accordingly. If user C changes position and no longer offers a view to the target object, the software can dynamically identify another user (e.g. user B) who can provide a better view for user C.

In accordance with further aspects, the system will track the seating arrangement of viewers in the environment and offer recommendations as to the positioning of viewers in order to maximize the effectiveness of the system to capture necessary views of the scene portions. A wearable device of a student entering the environment can indicate to the student where to sit in order to enhance the system's collaborative view sharing, for instance to (i) minimize a total number of students needed to obtain an unobstructed view of every cell, (ii) provide clearer or higher quality views of cells for which the existing view is sub-optimal, and/or (iii) minimize the number of obstructed cells for which video portions need to be obtained by the student's device, as examples.

When software in each wearable device pushes video portions for unobstructed cells the centralized server, it can also push the position of the obstruction(s) and the position of the student. When a student enters the class, a navigation application can determine and suggest a seating position for the student. For instance, based on the indications (maintained by the server) of the cells for which no views or relatively poor views are present and/or based on the position of the obstruction, the navigation application installed on the entering student's wearable device suggests the best position at which the student should sit.

The recommendation could be suggested by correlating the obstructed cells (quadrant and position to be filled in the student's grid) with the position of the student and the teacher. This student position recommendation could also be achieved through a supervised learning model using a student classroom visual training data-set. The centralized server can collect and store details of existing student positions, position of the obstruction(s), image quality indications, etc., and reverse map these to the grid to find the optimal position for the entering student.

The blackboard example described throughout is just one example of collaborative scene sharing for overcoming visual obstructions, in accordance with aspects described herein. These aspects can be generalized to any desired target screen, presentation, live event, or scene generally. In a relatively massive implementation, hundreds or thousands of viewers are watching a sporting event, concert, or the like in a large environment such as a stadium. There could be at any point in time multiple obstacles, such as nearby viewers who stand up, suspended cameras or other equipment, a scoreboard, players on the field etc. Some or all of these obstacles might be dynamic in that their positioning and presence it not necessarily predictable. Appropriate video portions from the appropriate participating wearable devices will be identified and provided to other devices that can build aggregated, obstacle-free views of the scenes.

Approaches involving smart-boards and fixed cameras in a classroom with merely live streaming capabilities do not alone address problems that are addressed by aspects described herein. It is desired, and aspects described herein provide, for streaming appropriate video portions to various users based on their view of the obstacles, and this may be very dynamic, varying over time for a given person, and varying from one person to another. Users are able to view the target object(s)/scene as live as possible while compensating for obstructed views using video feeds from others, thus ensuring a live experience for the user.

Figure 4:
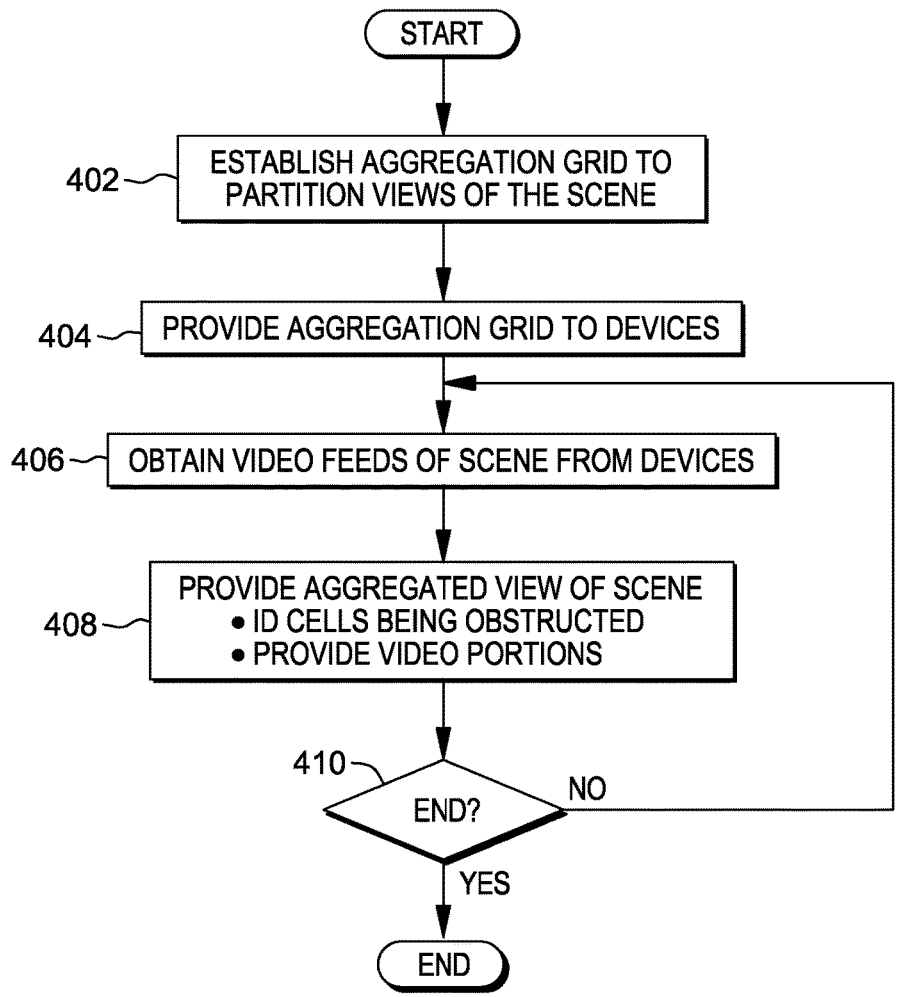
FIG. 4 depicts an example process for collaborative scene sharing for overcoming visual obstructions, in accordance with aspects described herein.

Accordingly, processes for collaborative scene sharing for overcoming visual obstructions are provided in accordance with aspects described herein. FIG. 4 depicts an example such process, which may be performed by one or more computer systems, such as one or more backend remote computer systems, one or more wearable devices, or a combination of the foregoing. Initially, there are a plurality of wearable devices viewing a scene from different angles, where an obstruction at least partially obstructs a portion of the scene from view by a wearable device of the plurality of wearable devices. The process establishes an aggregation grid partitioning views of the scene from the plurality of wearable devices into a plurality of cells (402). The aggregation grid may be consistent across the views from the plurality of wearable devices in that a given cell of the grid covers the same part of the scene regardless of the vantage point. The established aggregation grid is provided to the wearable device (404), for instance to facilitate its identification of the partitioning of the views of the scene into the plurality of cells. Video feeds of the scene (which may be live video feeds) are obtained from the plurality of wearable devices viewing the scene from the different angles (406). It is noted that this obtaining could be before and/or after the aggregation grid is established. In some examples, the live video feeds are obtained from the plurality of wearable devices based on providing them with the aggregation grid, where an obtained live video feed from a wearable device includes video portions corresponding to cells, of the aggregation grid, for which the view by the wearable device is unobstructed.

The process continues by providing an aggregated view of the scene to the wearable device (408). Provision of the aggregated view includes identifying one or more cells of the aggregation grid for which the view by the wearable device is obstructed by the obstruction, and providing to the wearable device one or more video portions obtained from at least one video feed of the plurality of video feeds, the one or more video portions corresponding to the one or more cells for which the view by the wearable device is obstructed, and the at least one video feed from which the one or more video portions are obtained being from at least one other wearable device, of the plurality of wearable devices, for which the view for the one or more cells is unobstructed. In some embodiments, the providing includes building the aggregated view of the scene by stitching together video portions from the plurality of live video feeds, the video portions corresponding to the cells of the aggregation grid and showing unobstructed views for the cells to provide an unobstructed aggregated view of the scene.

Unless it is decided at (410) to end the provision of the aggregated view of the scene to the wearable device, the process returns to (406) to continue obtaining video feeds of the scene and then provide the aggregated view, the thereby continually provide the aggregated view of the scene to the wearable device over a period of time. As part of this, updated video portions from the at least one live video feed are continually provided to the wearable device for presentation to a user in place of the obstructed view for the one or more cells. It is noted that the cells that are being obstructed from view may change over time as the obstruction or the viewer moves in the environment, and therefore the continuous provision of the aggregated view may include dynamically adjusting which particular cells from which wearable devices are being provided to the wearable device to provide the aggregated view for the wearable device.

It is also noted that the process of FIG. 4 may be performed to provide an aggregated view to each of multiple other devices. In this case, the aggregated view of the scene is provided to multiple other wearable devices of the plurality of wearable devices, the providing comprising: identifying, for each wearable device of the multiple other wearable devices, a respective one or more cells of the aggregation grid for which the view by the respective wearable device is being obstructed by the obstruction, and providing to each wearable device of the multiple other wearable devices a respective one or more video portions obtained from one or more video feeds of the plurality of video feeds, the respective one or more video portions corresponding to the respective one or more cells for which the view by the respective wearable device is being obstructed.

The obtaining the plurality of live video feeds, the establishing the aggregation grid, and the providing the aggregated view of the scene are performed, in some embodiments, by the wearable device (to which the aggregated view is provided) itself, and the wearable device can aggregate the view of the scene on a transparent display of the wearable device, in which the one or more video portions are provided on the transparent display for the one or more cells for which the view by the wearable device is being obstructed, and no video portions are provided on the transparent display for cells for which the view by the wearable device is unobstructed. Additionally or alternatively, the obtaining the plurality of live video feeds, the establishing the aggregation grid, and the providing the aggregated view of the scene can be performed by a server separate from the plurality of wearable devices, where the providing the one or more video portions includes the server sending the one or more video portions to the wearable device (to which the aggregated view is provided).

In some examples, an indication is received from the wearable device, the indication being an indication of the one or more cells of the aggregation grid for which the view by the wearable device is obstructed by the obstruction. The received indication of the one or more cells may be used (i.e. by the computer system performing a process to provide the aggregated view) to identify the one or more cells and provide the one or more video portions to the wearable device.

Additionally or alternatively, video portions of the obtained plurality of live video feeds may be normalized prior to providing the one or more video portions to the wearable device.

The cell size and/or other characteristics of the aggregation grid may be dynamically adjusted periodically or aperiodically, and the adjustment may be based on an assessed quality of the aggregated view of the scene.

As an enhancement, a live video feed of the plurality of live video feeds may be obtained from a device viewing at least a portion of the scene from a vantage point of the obstruction. An example described herein is the device being worn by a teacher who is writing on the board and partially obstructing the view of the students to the board. The portion of the scene can correspond to (i.e. cover or encompass) a cell of the one or more cells for which the view by the wearable device is obstructed. In this situation, at least one video portion provided to the wearable device for the cell can include a video portion from the live video feed from that device viewing from the vantage point of the obstruction.

Based on detecting presence of another wearable device for participation, for instance the entrance of another student into the environment, the process can determine at least one cell of the aggregation grid for which a new view is desired. Based on that determination, the process can provide a suggestion of a position at which the another wearable device is to be situated such that provision of a live video feed by that another wearable device from the position provides a live video feed with video portions providing the new view. 'New' view in this sense may be one for which no view was previously provided and therefore the requested position is selected to provide the view. Alternatively, the new view may be a better view, offer better quality feed, and/or one providing a different vantage point than a view (of the cell) currently being provided by one of the wearable devices already participating.

Processes described herein may be performed singly or collectively by one or more computer systems, such as computer system(s) described below with reference to FIG. 5. In some examples, such a computer system that performs process(es) described herein is a wearable device on which an aggregated view is provided. Additionally or alternatively, a remote computer system in communication with such computer system performs process(es) described herein. As a third possibility, a combination of the (i) wearable device and (ii) remote computing system(s) perform process(es) described herein.

Figure 5:
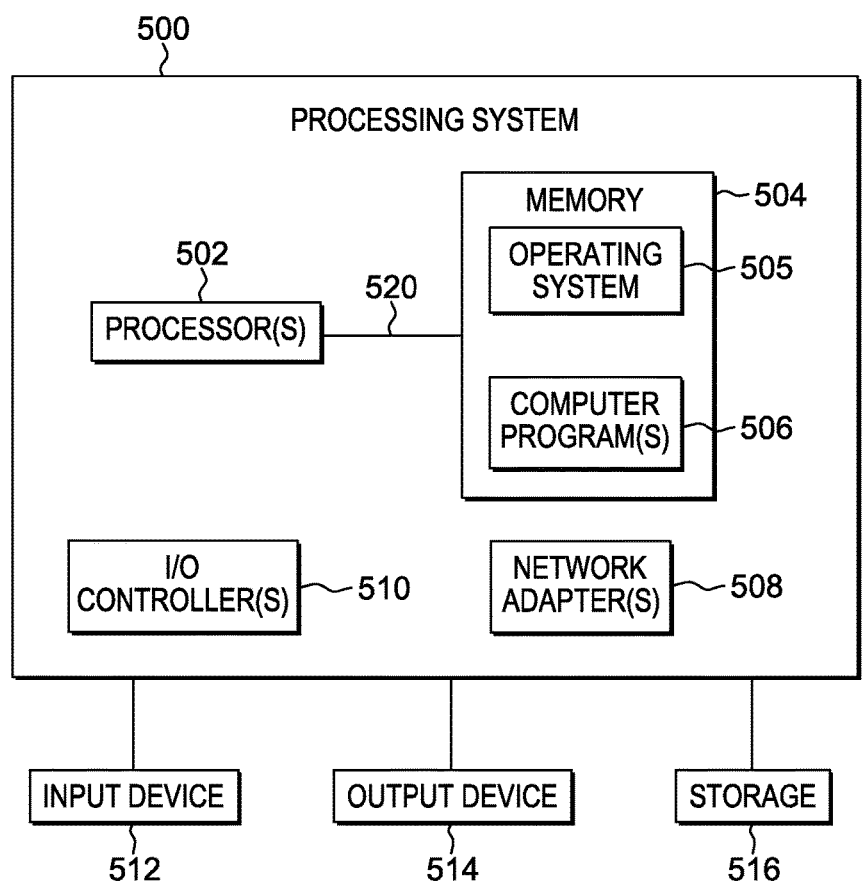
FIG. 5 depicts an example of a computer system to incorporate or use aspects described herein.

FIG. 5 depicts one example of a computer system to incorporate and use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapters 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer system.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance, virtualization device, storage controller, etc.

FIG. 6 depicts another example of a computer system to incorporate and use aspects described herein. FIG. 6 depicts an example eyewear based wearable device. Device 600 can include many of the same types of components included in computer system 500 described above. In the example of FIG. 6, device 600 is configured to be wearable on the head of the device user. The device includes a display 602 that is positioned in a peripheral vision line of sight of the user when the device is in operative position on the user's head. Suitable displays can utilize LCD, CRT, or OLED display technologies, as examples. Lenses 614 may optionally include active translucent displays, in which an inner and/or outer surface of the lenses are capable of displaying images and other content. This provides the ability to impose this content directly into the line of sight of the user, overlaying at least part of the user's view to the environment through the lenses. In particular embodiments described herein, content presented on the lens displays are video portions that provide an unobstructed view of a scene by overlaying with this video portions areas of the user's view that include an obstructed view to the scene.

Device 600 also includes touch input portion 604 that enable users to input touch-gestures in order to control functions of the device. Such gestures can be interpreted as commands, for instance a command to take a picture, or a command to launch a particular service. Device 600 also includes button 606 in order to control function(s) of the device. Example functions include locking, shutting down, or placing the device into a standby or sleep mode.

Various other input devices are provided, such as camera 608, which can be used to capture images or video. The camera can also be used by the device to obtain an image of the user's view of his or her environment to use in, for instance, capturing images/videos of a scene. One or more microphones, proximity sensors, light sensors, accelerometers, speakers, GPS devices, and/or other input devices (not labeled) may be additionally provided, for instance within housing 610. Housing 610 can also include other electronic components, such as electronic circuitry, including processor(s), memory, and/or communications devices, such as cellular, short-range wireless (e.g. Bluetooth), or WiFi circuitry for connection to remote devices. Housing 610 can further include a power source, such as a battery to power components of device 600. Additionally or alternatively, any such circuitry or battery can be included in enlarged end 612, which may be enlarged to accommodate such components. Enlarged end 612, or any other portion of device 600, can also include physical port(s) (not pictured) used to connect device 600 to a power source (to recharge a battery) and/or any other external device, such as a computer. Such physical ports can be of any standardized or proprietary type, such as Universal Serial Bus (USB).

Figure 7:
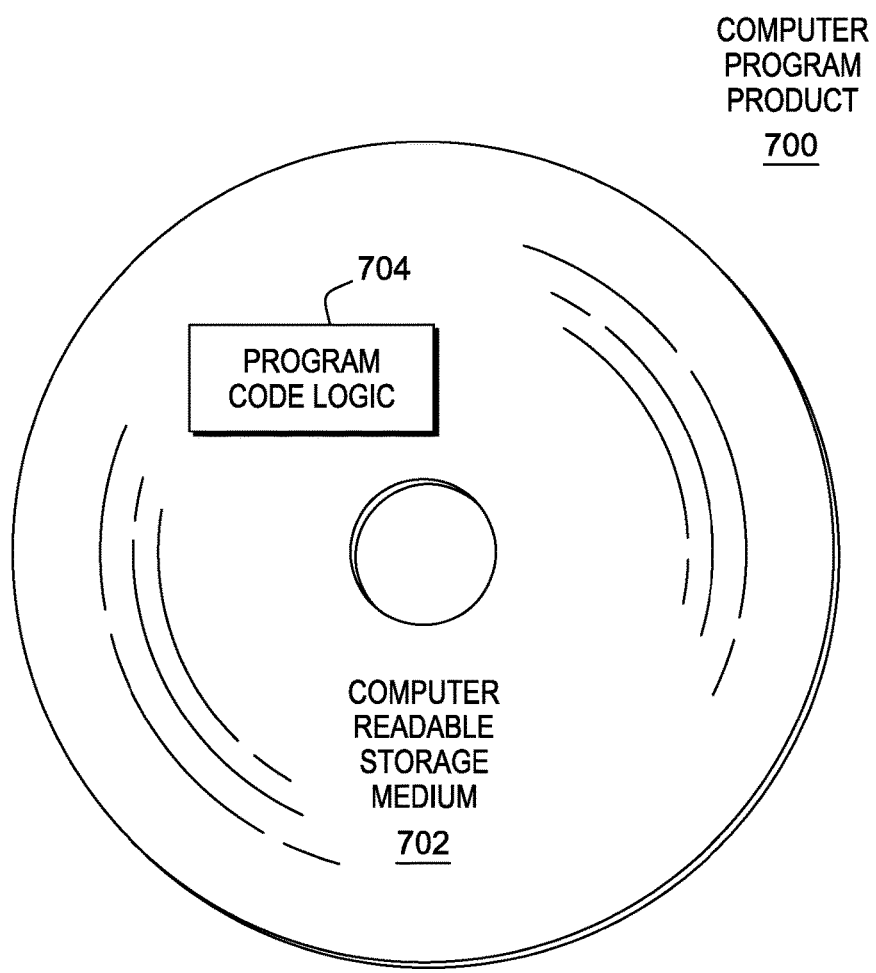
FIG. 7 depicts one embodiment of a computer program product.

Referring to FIG. 7, in one example, a computer program product 700 includes, for instance, one or more computer readable storage media 702 to store computer readable program code means, logic and/or instructions 704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining an aggregation grid, the aggregation grid providing a consistent partitioning of views of a scene of an environment for a plurality of devices into a plurality of segments, the plurality of devices capturing respective video feeds of the scene of the environment from different angles; and
    based on an obstruction at least partially obstructing a portion of the scene from view by a component, building an aggregated view of the scene for the component, the building comprising:
        identifying a segment of the aggregation grid for which the view of the scene by the component is obstructed by the obstruction;
        obtaining, from a device of the plurality of devices, a video portion of a video feed of the respective video feeds, the video portion corresponding to the segment for which the view by the component is obstructed, and the video feed being from a device for which the view for the segment is unobstructed; and
        providing for the component an aggregated view to the scene, the aggregated view comprising the obtained video portion, in which the video portion is provided, as part of the aggregated view, for the segment for which the view by the component is being obstructed.

2. The method of claim 1, wherein the providing the aggregated view for the component comprises sending the aggregated view to the component.

3. The method of claim 1, wherein the building further comprises providing to the device an indication of the identified segment and receiving the video portion from the device in response to the providing the indication of the identified segment.

4. The method of claim 1, wherein the device views at least a portion of the scene from a vantage point of the obstruction, the at least a portion of the scene corresponding to the segment for which the view by the component is obstructed, and wherein the video portion obtained for the segment comprises a video portion from the video feed from the device.

5. The method of claim 1, wherein the obtaining and building are performed by the component.

6. The method of claim 5, wherein the component aggregates the view of the scene on a transparent display of the component, in which the video portion is provided on the transparent display for the segment for which the view by the component is being obstructed, and no video portions are provided on the transparent display for other segments for which the view by the component is unobstructed.

7. The method of claim 5, wherein the component is a device of the plurality of devices.

8. The method of claim 1, further comprising continually building the aggregated view of the scene over a period of time, wherein updated video portions from the video feed are continually provided for presentation in place of the obstructed view for the segment.

9. The method of claim 1, further comprising dynamically adjusting segment size of the aggregation grid based on quality of the aggregated view of the scene.

10. A computer system comprising:
    a memory; and
    a processor in communication with the memory, wherein the computer system is configured to perform a method, the method comprising:
        obtaining an aggregation grid, the aggregation grid providing a consistent partitioning of views of a scene of an environment for a plurality of devices into a plurality of segments, the plurality of devices capturing respective video feeds of the scene of the environment from different angles; and based on an obstruction at least partially obstructing a portion of the scene from view by a component, building an aggregated view of the scene for the component, the building comprising:

identifying a segment of the aggregation grid for which the view of the scene by the component is obstructed by the obstruction;

obtaining, from a device of the plurality of devices, a video portion of a video feed of the respective video feeds, the video portion corresponding to the segment for which the view by the component is obstructed, and the video feed being from a device for which the view for the segment is unobstructed; and providing for the component an aggregated view to the scene, the aggregated view comprising the obtained video portion, in which the video portion is provided, as part of the aggregated view, for the segment for which the view by the component is being obstructed.

11. The computer system of claim 10, wherein the providing the aggregated view for the component comprises sending the aggregated view to the component.

12. The computer system of claim 10, wherein the device views at least a portion of the scene from a vantage point of the obstruction, the at least a portion of the scene corresponding to the segment for which the view by the component is obstructed, and wherein the video portion obtained for the segment comprises a video portion from the video feed from the device.

13. The computer system of claim 10, wherein the computer system is the component.

14. The computer system of claim 10, wherein the method further comprises continually building the aggregated view of the scene over a period of time, wherein updated video portions from the video feed are continually provided for presentation in place of the obstructed view for the segment.

15. The computer system of claim 10, wherein the method further comprises dynamically adjusting segment size of the aggregation grid based on quality of the aggregated view of the scene.

16. A computer program product comprising:

a computer readable storage medium readable by a processing circuit and storing instructions for execution by the processing circuit for performing a method comprising:

obtaining an aggregation grid, the aggregation grid providing a consistent partitioning of views of a scene of an environment for a plurality of devices into a plurality of segments, the plurality of devices capturing respective video feeds of the scene of the environment from different angles; and based on an obstruction at least partially obstructing a portion of the scene from view by a component, building an aggregated view of the scene for the component, the building comprising:

identifying a segment of the aggregation grid for which the view of the scene by the component is obstructed by the obstruction;

obtaining, from a device of the plurality of devices, a video portion of a video feed of the respective video feeds, the video portion corresponding to the segment for which the view by the component is obstructed, and the video feed being from a device for which the view for the segment is unobstructed; and providing for the component an aggregated view to the scene, the aggregated view comprising the obtained video portion, in which the video portion is provided, as part of the aggregated view, for the segment for which the view by the component is being obstructed.

17. The computer program product of claim 16, wherein the providing the aggregated view for the component comprises sending the aggregated view to the component.

18. The computer program product of claim 16, wherein the device views at least a portion of the scene from a vantage point of the obstruction, the at least a portion of the scene corresponding to the segment for which the view by the component is obstructed, and wherein the video portion obtained for the segment comprises a video portion from the video feed from the device.

19. The computer program product of claim 16, wherein the obtaining and building are performed by the component.

20. The computer program product of claim 16, wherein the method further comprises continually building the aggregated view of the scene over a period of time, wherein updated video portions from the video feed are continually provided for presentation in place of the obstructed view for the segment.

* * * * *